(12) United States Patent
Wolrich et al.

(10) Patent No.: US 7,610,451 B2
(45) Date of Patent: Oct. 27, 2009

(54) DATA TRANSFER MECHANISM USING UNIDIRECTIONAL PULL BUS AND PUSH BUS

(75) Inventors: Gilbert Wolrich, Framingham, MA (US); Mark B. Rosenbluth, Uxbridge, MA (US); Debra Bernstein, Sudbury, MA (US); Matthew J. Adiletta, Worcester, MA (US)

(73) Assignee: Intel Corporation, Santa Clara, CA (US)

( * ) Notice: Subject to any disclaimer, the term of this patent is extended or adjusted under 35 U.S.C. 154(b) by 29 days.

(21) Appl. No.: 10/057,738

(22) Filed: Jan. 25, 2002

(65) Prior Publication Data

US 2003/0145155 A1    Jul. 31, 2003

(51) Int. Cl.
*G06F 12/00*    (2006.01)
*G06F 15/00*    (2006.01)

(52) U.S. Cl. .................. 711/150; 711/148; 711/149; 711/165; 712/228

(58) Field of Classification Search ................ 711/105, 711/150, 154; 712/225, 228
See application file for complete search history.

(56) References Cited

U.S. PATENT DOCUMENTS

| | | | |
|---|---|---|---|
| 3,373,408 A | 3/1968 | Ling | |
| 3,478,322 A | 11/1969 | Evans | |
| 3,792,441 A | 2/1974 | Wymore et al. | |
| 3,881,173 A | 4/1975 | Larsen et al. | |
| 3,913,074 A | 10/1975 | Homberg et al. | |
| 3,940,745 A | 2/1976 | Sajeva | |
| 4,023,023 A | 5/1977 | Bourrez et al. | |
| 4,045,782 A | 8/1977 | Anderson et al. | |
| 4,130,890 A | 12/1978 | Adam | |
| 4,189,767 A | 2/1980 | Ahuja | |
| 4,392,758 A | 7/1983 | Bowles et al. | |
| 4,400,770 A | 8/1983 | Chan et al. | |
| 4,514,807 A | 4/1985 | Nogi | |
| 4,523,272 A | 6/1985 | Fukunaga et al. | |
| 4,569,016 A | 2/1986 | Hao et al. | |
| 4,724,521 A | 2/1988 | Carron et al. | |
| 4,742,451 A | 5/1988 | Bruckert et al. | |

(Continued)

FOREIGN PATENT DOCUMENTS

EP    0 379 709    8/1990

(Continued)

OTHER PUBLICATIONS

U.S. Appl. No. 09/475,614, filed Dec. 30, 1999, Wolrich et al.

(Continued)

*Primary Examiner*—Reginald G Bragdon
*Assistant Examiner*—Shawn X Gu
(74) *Attorney, Agent, or Firm*—Fish & Richardson P.C.

(57) ABSTRACT

A method for transferring data between programming agents and memory resources. The method includes transferring data between a processing agent and a memory resource, designating the memory resource for pushing the data to the processing agent via a push bus having a plurality of sources that arbitrate use of the push bus, and designating the memory resource for receiving the data from the processing agent via a pull bus having a plurality of destinations that arbitrate use of the pull bus.

29 Claims, 6 Drawing Sheets

U.S. PATENT DOCUMENTS

| | | |
|---|---|---|
| 4,745,544 A | 5/1988 | Renner et al. |
| 4,777,587 A | 10/1988 | Case et al. |
| 4,833,657 A | 5/1989 | Tanaka |
| 4,866,664 A | 9/1989 | Burkhardt, Jr. et al. |
| 4,868,735 A | 9/1989 | Moller et al. |
| 4,992,934 A | 2/1991 | Portanova et al. |
| 5,008,808 A | 4/1991 | Fries et al. |
| 5,073,864 A | 12/1991 | Methvin et al. |
| 5,113,516 A | 5/1992 | Johnson |
| 5,140,685 A | 8/1992 | Sipple et al. |
| 5,142,676 A | 8/1992 | Fried et al. |
| 5,142,683 A | 8/1992 | Burkhardt, Jr. et al. |
| 5,155,831 A | 10/1992 | Emma et al. |
| 5,155,854 A | 10/1992 | Flynn et al. |
| 5,165,025 A | 11/1992 | Lass |
| 5,166,872 A | 11/1992 | Weaver et al. |
| 5,168,555 A | 12/1992 | Byers et al. |
| 5,173,897 A | 12/1992 | Schrodi et al. |
| 5,247,671 A | 9/1993 | Adkins et al. |
| 5,255,239 A | 10/1993 | Taborn et al. |
| 5,263,169 A | 11/1993 | Genusov et al. |
| 5,274,770 A | 12/1993 | Yeoh et al. |
| 5,347,648 A | 9/1994 | Stamm et al. |
| 5,357,617 A | 10/1994 | Davis et al. |
| 5,363,448 A | 11/1994 | Koopman, Jr. et al. |
| 5,367,678 A | 11/1994 | Lee et al. |
| 5,390,329 A | 2/1995 | Gaertner et al. |
| 5,392,391 A | 2/1995 | Caulk, Jr. et al. |
| 5,392,411 A | 2/1995 | Ozaki |
| 5,392,412 A | 2/1995 | McKenna |
| 5,404,464 A | 4/1995 | Bennett |
| 5,404,482 A | 4/1995 | Stamm et al. |
| 5,428,809 A | 6/1995 | Coffin et al. |
| 5,432,918 A | 7/1995 | Stamm |
| 5,436,626 A | 7/1995 | Fujiwara et al. |
| 5,442,756 A | 8/1995 | Grochowski et al. |
| 5,448,702 A | 9/1995 | Garcia, Jr. et al. |
| 5,450,351 A | 9/1995 | Heddes |
| 5,450,603 A | 9/1995 | Davies |
| 5,452,437 A | 9/1995 | Richey et al. |
| 5,459,842 A | 10/1995 | Begun et al. |
| 5,463,625 A | 10/1995 | Yasrebi |
| 5,467,452 A | 11/1995 | Blum et al. |
| 5,481,683 A | 1/1996 | Karim |
| 5,487,159 A | 1/1996 | Byers et al. |
| 5,517,628 A | 5/1996 | Morrison et al. |
| 5,517,648 A | 5/1996 | Bertone et al. |
| 5,541,920 A | 7/1996 | Angle et al. |
| 5,542,070 A | 7/1996 | LeBlanc et al. |
| 5,542,088 A | 7/1996 | Jennings, Jr. et al. |
| 5,544,236 A | 8/1996 | Adruska et al. |
| 5,550,816 A | 8/1996 | Hardwick et al. |
| 5,557,766 A | 9/1996 | Takiguchi et al. |
| 5,568,617 A | 10/1996 | Kametani |
| 5,574,922 A | 11/1996 | James |
| 5,574,939 A | 11/1996 | Keckler et al. |
| 5,592,622 A | 1/1997 | Isfeld et al. |
| 5,600,812 A | 2/1997 | Park |
| 5,606,676 A | 2/1997 | Grochowski et al. |
| 5,610,864 A | 3/1997 | Manning |
| 5,613,071 A | 3/1997 | Rankin et al. |
| 5,613,136 A | 3/1997 | Casavant et al. |
| 5,623,489 A | 4/1997 | Cotton et al. |
| 5,627,829 A | 5/1997 | Gleeson et al. |
| 5,630,130 A | 5/1997 | Perotto et al. |
| 5,640,538 A | 6/1997 | Dyer et al. |
| 5,644,623 A | 7/1997 | Gulledge |
| 5,649,109 A | 7/1997 | Griesmer et al. |
| 5,649,157 A | 7/1997 | Williams |
| 5,652,583 A | 7/1997 | Kang |
| 5,659,687 A | 8/1997 | Kim et al. |
| 5,659,722 A | 8/1997 | Blaner et al. |
| 5,680,641 A | 10/1997 | Sidman |
| 5,689,566 A | 11/1997 | Nguyen |
| 5,692,167 A | 11/1997 | Grochowski et al. |
| 5,699,537 A | 12/1997 | Sharangpani et al. |
| 5,701,435 A | 12/1997 | Chi |
| 5,717,760 A | 2/1998 | Satterfield |
| 5,717,898 A | 2/1998 | Kagan et al. |
| 5,721,870 A | 2/1998 | Matsumoto |
| 5,724,563 A | 3/1998 | Hasegawa |
| 5,742,587 A | 4/1998 | Zornig et al. |
| 5,742,782 A | 4/1998 | Ito et al. |
| 5,742,822 A | 4/1998 | Motomura |
| 5,745,913 A | 4/1998 | Pattin et al. |
| 5,751,987 A | 5/1998 | Mahant-Shetti et al. |
| 5,761,507 A | 6/1998 | Govett |
| 5,761,522 A | 6/1998 | Hisanga et al. |
| 5,781,774 A | 7/1998 | Krick |
| 5,784,649 A | 7/1998 | Begur et al. |
| 5,784,712 A | 7/1998 | Byers et al. |
| 5,790,813 A | 8/1998 | Whittaker |
| 5,796,413 A | 8/1998 | Shipp et al. |
| 5,797,043 A | 8/1998 | Lewis et al. |
| 5,809,235 A | 9/1998 | Sharma et al. |
| 5,809,530 A | 9/1998 | Samra et al. |
| 5,812,799 A | 9/1998 | Zuravleff et al. |
| 5,812,839 A | 9/1998 | Hoyt et al. |
| 5,812,868 A | 9/1998 | Moyer et al. |
| 5,813,031 A | 9/1998 | Chou et al. |
| 5,815,714 A | 9/1998 | Shridhar et al. |
| 5,819,080 A | 10/1998 | Dutton et al. |
| 5,828,746 A | 10/1998 | Ardon |
| 5,828,863 A | 10/1998 | Barrett et al. |
| 5,829,033 A | 10/1998 | Hagersten et al. |
| 5,832,215 A | 11/1998 | Kato et al. |
| 5,832,258 A | 11/1998 | Kiuchi et al. |
| 5,835,755 A | 11/1998 | Stellwagen, Jr. |
| 5,835,928 A | 11/1998 | Auslander et al. |
| 5,854,922 A | 12/1998 | Gravenstein et al. |
| 5,860,158 A | 1/1999 | Pai et al. |
| 5,886,992 A | 3/1999 | Raatikainen et al. |
| 5,887,134 A | 3/1999 | Ebrahim |
| 5,890,208 A | 3/1999 | Kwon |
| 5,892,979 A | 4/1999 | Shiraki et al. |
| 5,893,162 A | 4/1999 | Lau et al. |
| 5,905,876 A | 5/1999 | Pawlowski et al. |
| 5,905,889 A | 5/1999 | Wilhelm, Jr. et al. |
| 5,915,123 A | 6/1999 | Mirsky et al. |
| 5,933,627 A | 8/1999 | Parady |
| 5,937,187 A | 8/1999 | Kosche et al. |
| 5,938,736 A | 8/1999 | Muller et al. |
| 5,940,612 A | 8/1999 | Brady et al. |
| 5,940,866 A | 8/1999 | Chisholm et al. |
| 5,946,487 A | 8/1999 | Dangelo |
| 5,948,081 A | 9/1999 | Foster |
| 5,951,679 A | 9/1999 | Anderson et al. |
| 5,958,031 A | 9/1999 | Kime |
| 5,961,628 A | 10/1999 | Nguyen et al. |
| 5,970,013 A | 10/1999 | Fischer et al. |
| 5,978,838 A | 11/1999 | Mohammed et al. |
| 5,978,874 A * | 11/1999 | Singhal et al. .............. 710/107 |
| 5,983,274 A | 11/1999 | Hyder et al. |
| 5,996,068 A | 11/1999 | Dwyer, III et al. |
| 6,002,881 A | 12/1999 | York et al. |
| 6,009,505 A | 12/1999 | Thayer et al. |
| 6,009,515 A | 12/1999 | Steele, Jr. |
| 6,012,151 A | 1/2000 | Mano |
| 6,014,729 A | 1/2000 | Lannan et al. |
| 6,023,742 A | 2/2000 | Ebeling et al. |
| 6,029,170 A | 2/2000 | Garger et al. |
| 6,029,228 A | 2/2000 | Cai et al. |
| 6,047,334 A | 4/2000 | Langendorf et al. |
| 6,058,168 A | 5/2000 | Braband |

| | | | |
|---|---|---|---|
| 6,058,465 A | 5/2000 | Nguyen | |
| 6,067,585 A | 5/2000 | Hoang | |
| 6,070,231 A | 5/2000 | Ottinger | |
| 6,072,781 A | 6/2000 | Feeney et al. | |
| 6,073,215 A | 6/2000 | Snyder | |
| 6,076,129 A | 6/2000 | Fenwick et al. | |
| 6,076,158 A | 6/2000 | Sites et al. | |
| 6,079,008 A | 6/2000 | Clery, III | |
| 6,079,014 A | 6/2000 | Papworth et al. | |
| 6,085,215 A | 7/2000 | Ramakrishnan et al. | |
| 6,085,294 A | 7/2000 | Van Doren et al. | |
| 6,088,783 A * | 7/2000 | Morton | 712/22 |
| 6,092,127 A | 7/2000 | Taushek | |
| 6,092,158 A | 7/2000 | Harriman et al. | |
| 6,092,175 A | 7/2000 | Levy et al. | |
| 6,112,016 A | 8/2000 | MacWilliams et al. | |
| 6,115,811 A | 9/2000 | Steele, Jr. | |
| 6,134,665 A | 10/2000 | Klein et al. | |
| 6,141,348 A | 10/2000 | Muntz | |
| 6,141,689 A | 10/2000 | Yasrebi | |
| 6,141,765 A | 10/2000 | Sherman | |
| 6,144,669 A | 11/2000 | Williams et al. | |
| 6,145,054 A | 11/2000 | Mehotra et al. | |
| 6,145,123 A | 11/2000 | Torrey et al. | |
| 6,157,955 A | 12/2000 | Narad et al. | |
| 6,160,562 A | 12/2000 | Chin et al. | |
| 6,173,349 B1 | 1/2001 | Qureshi et al. | |
| 6,182,177 B1 | 1/2001 | Harriman | |
| 6,195,676 B1 | 2/2001 | Spix et al. | |
| 6,199,133 B1 | 3/2001 | Schnell | |
| 6,201,807 B1 | 3/2001 | Prasanna | |
| 6,212,542 B1 | 4/2001 | Kahle et al. | |
| 6,212,602 B1 | 4/2001 | Wicki et al. | |
| 6,212,604 B1 | 4/2001 | Tremblay | |
| 6,212,611 B1 | 4/2001 | Nizar et al. | |
| 6,216,220 B1 | 4/2001 | Hwang | |
| 6,223,207 B1 | 4/2001 | Lucovsky et al. | |
| 6,223,238 B1 | 4/2001 | Meyer et al. | |
| 6,223,277 B1 | 4/2001 | Karguth | |
| 6,223,279 B1 | 4/2001 | Nishimura et al. | |
| 6,230,119 B1 | 5/2001 | Mitchell | |
| 6,230,261 B1 | 5/2001 | Henry et al. | |
| 6,233,599 B1 | 5/2001 | Nation et al. | |
| 6,247,025 B1 | 6/2001 | Bacon | |
| 6,247,040 B1 * | 6/2001 | Born et al. | 709/103 |
| 6,247,086 B1 | 6/2001 | Allingham | |
| 6,249,829 B1 | 6/2001 | Bloks et al. | |
| 6,256,713 B1 | 7/2001 | Audityan et al. | |
| 6,272,616 B1 | 8/2001 | Fernando et al. | |
| 6,275,505 B1 | 8/2001 | O'Laughlin et al. | |
| 6,278,289 B1 | 8/2001 | Guccione et al. | |
| 6,279,113 B1 | 8/2001 | Vaidya | |
| 6,289,011 B1 | 9/2001 | Seo et al. | |
| 6,298,370 B1 | 10/2001 | Tang et al. | |
| 6,307,789 B1 | 10/2001 | Wolrich et al. | |
| 6,311,256 B2 | 10/2001 | Halligan et al. | |
| 6,324,624 B1 | 11/2001 | Wolrich et al. | |
| 6,345,334 B1 | 2/2002 | Nakagawa et al. | |
| 6,347,344 B1 | 2/2002 | Baker et al. | |
| 6,351,808 B1 | 2/2002 | Joy et al. | |
| 6,356,692 B1 | 3/2002 | Ido et al. | |
| 6,356,962 B1 | 3/2002 | Kasper et al. | |
| 6,357,016 B1 | 3/2002 | Rodgers et al. | |
| 6,360,262 B1 | 3/2002 | Guenthner et al. | |
| 6,366,978 B1 | 4/2002 | Middleton et al. | |
| 6,373,848 B1 | 4/2002 | Allison et al. | |
| 6,378,124 B1 | 4/2002 | Bates et al. | |
| 6,381,668 B1 | 4/2002 | Lunteren | |
| 6,389,449 B1 | 5/2002 | Nemirovsky et al. | |
| 6,393,483 B1 | 5/2002 | Latif et al. | |
| 6,401,149 B1 * | 6/2002 | Dennin et al. | 710/58 |
| 6,408,325 B1 * | 6/2002 | Shaylor | 718/108 |
| 6,415,338 B1 | 7/2002 | Habot | |
| 6,426,940 B1 | 7/2002 | Seo et al. | |
| 6,427,196 B1 | 7/2002 | Adiletta et al. | |
| 6,430,626 B1 | 8/2002 | Witkowski et al. | |
| 6,430,646 B1 | 8/2002 | Thusoo et al. | |
| 6,434,145 B1 | 8/2002 | Opsasnick et al. | |
| 6,449,289 B1 | 9/2002 | Quicksall | |
| 6,457,078 B1 | 9/2002 | Magro et al. | |
| 6,463,072 B1 | 10/2002 | Wolrich et al. | |
| 6,480,943 B1 | 11/2002 | Douglas et al. | |
| 6,490,642 B1 | 12/2002 | Thekkath et al. | |
| 6,496,925 B1 | 12/2002 | Rodgers et al. | |
| 6,505,229 B1 | 1/2003 | Turner et al. | |
| 6,505,281 B1 * | 1/2003 | Sherry | 711/168 |
| 6,513,089 B1 * | 1/2003 | Hofmann et al. | 710/309 |
| 6,523,108 B1 | 2/2003 | James et al. | |
| 6,529,999 B1 | 3/2003 | Keller et al. | |
| 6,532,509 B1 | 3/2003 | Wolrich et al. | |
| 6,539,439 B1 | 3/2003 | Nguyen et al. | |
| 6,552,826 B2 | 4/2003 | Adler et al. | |
| 6,560,667 B1 | 5/2003 | Wolrich et al. | |
| 6,570,877 B1 | 5/2003 | Kloth et al. | |
| 6,577,542 B2 | 6/2003 | Wolrich et al. | |
| 6,577,625 B1 | 6/2003 | Chiou et al. | |
| 6,581,124 B1 | 6/2003 | Anand | |
| 6,584,522 B1 | 6/2003 | Wolrich et al. | |
| 6,587,905 B1 * | 7/2003 | Correale et al. | 710/107 |
| 6,587,906 B2 | 7/2003 | Wolrich et al. | |
| 6,606,704 B1 * | 8/2003 | Adiletta et al. | 712/248 |
| 6,625,654 B1 | 9/2003 | Wolrich et al. | |
| 6,628,652 B1 | 9/2003 | Chrin et al. | |
| 6,629,237 B2 | 9/2003 | Wolrich et al. | |
| 6,631,430 B1 | 10/2003 | Wolrich et al. | |
| 6,631,462 B1 | 10/2003 | Wolrich et al. | |
| 6,633,938 B1 | 10/2003 | Rowlands et al. | |
| 6,643,726 B1 * | 11/2003 | Patkar et al. | 710/306 |
| 6,654,836 B1 * | 11/2003 | Misra et al. | 710/110 |
| 6,661,794 B1 | 12/2003 | Wolrich et al. | |
| 6,661,795 B1 | 12/2003 | Adas et al. | |
| 6,667,920 B2 | 12/2003 | Wolrich et al. | |
| 6,668,311 B2 | 12/2003 | Hooper et al. | |
| 6,668,317 B1 | 12/2003 | Bernstein et al. | |
| 6,671,761 B2 | 12/2003 | Kim | |
| 6,671,827 B2 | 12/2003 | Guilford et al. | |
| 6,678,248 B1 | 1/2004 | Haddock et al. | |
| 6,681,300 B2 | 1/2004 | Wolrich et al. | |
| 6,684,361 B2 | 1/2004 | Tong et al. | |
| 6,694,380 B1 | 2/2004 | Wolrich et al. | |
| 6,697,923 B2 | 2/2004 | Chen et al. | |
| 6,724,767 B1 | 4/2004 | Chong et al. | |
| 6,725,313 B1 | 4/2004 | Wingard et al. | |
| 6,728,845 B2 | 4/2004 | Adiletta et al. | |
| 6,738,831 B2 | 5/2004 | Wolrich et al. | |
| 6,754,662 B1 | 6/2004 | Li | |
| 6,754,795 B2 | 6/2004 | Chen et al. | |
| 6,781,992 B1 | 8/2004 | Rana et al. | |
| 6,785,843 B1 | 8/2004 | McRae et al. | |
| 6,823,399 B2 | 11/2004 | Horiguchi et al. | |
| 6,826,180 B1 | 11/2004 | Bergantino et al. | |
| 6,847,645 B1 | 1/2005 | Potter et al. | |
| 6,868,476 B2 | 3/2005 | Rosenbluth et al. | |
| 6,889,319 B1 | 5/2005 | Rodgers et al. | |
| 6,941,438 B2 | 9/2005 | Wolrich et al. | |
| 6,958,973 B1 | 10/2005 | Chen et al. | |
| 7,028,118 B2 | 4/2006 | Smith et al. | |
| 7,051,329 B1 | 5/2006 | Boggs et al. | |
| 7,089,379 B1 | 8/2006 | Sharma et al. | |
| 7,216,204 B2 | 5/2007 | Rosenbluth et al. | |
| 7,225,281 B2 | 5/2007 | Rosenbluth et al. | |
| 7,337,275 B2 | 2/2008 | Wolrich et al. | |
| 2001/0043614 A1 | 11/2001 | Viswanadham et al. | |
| 2002/0053017 A1 | 5/2002 | Adiletta et al. | |
| 2002/0056037 A1 | 5/2002 | Wolrich et al. | |
| 2003/0012198 A1 | 1/2003 | Kaganoi et al. | |

| | | | |
|---|---|---|---|
| 2003/0041216 A1 | 2/2003 | Rosenbluth et al. | |
| 2003/0041228 A1 | 2/2003 | Rosenbluth et al. | |
| 2003/0046488 A1 | 3/2003 | Rosenbluth et al. | |
| 2003/0065862 A1 | 4/2003 | Wyland | |
| 2003/0078950 A1 | 4/2003 | Abernathy et al. | |
| 2003/0105899 A1* | 6/2003 | Rosenbluth et al. | 710/104 |
| 2003/0145155 A1 | 7/2003 | Wolrich et al. | |
| 2003/0145159 A1 | 7/2003 | Adiletta et al. | |
| 2003/0191866 A1 | 10/2003 | Wolrich et al. | |
| 2004/0034743 A1 | 2/2004 | Wolrich et al. | |
| 2004/0039895 A1 | 2/2004 | Wolrich et al. | |
| 2004/0054880 A1 | 3/2004 | Bernstein et al. | |
| 2004/0071152 A1 | 4/2004 | Wolrich et al. | |
| 2004/0073728 A1 | 4/2004 | Wolrich et al. | |
| 2004/0073778 A1 | 4/2004 | Adiletta et al. | |
| 2004/0098496 A1 | 5/2004 | Wolrich et al. | |
| 2004/0109369 A1 | 6/2004 | Wolrich et al. | |
| 2004/0139290 A1 | 7/2004 | Wolrich et al. | |
| 2004/0205747 A1 | 10/2004 | Bernstein et al. | |
| 2005/0132132 A1 | 6/2005 | Rosenbluth et al. | |
| 2005/0185437 A1 | 8/2005 | Wolrich et al. | |

FOREIGN PATENT DOCUMENTS

| | | |
|---|---|---|
| EP | 0 464 715 | 1/1992 |
| EP | 0 633 678 | 1/1995 |
| EP | 0 745 933 | 12/1996 |
| EP | 0 809 180 | 11/1997 |
| EP | 0 953 897 | 11/1999 |
| EP | 1 191 445 | 3/2002 |
| GB | 2 344 665 | 6/2000 |
| JP | 59-111533 | 6/1984 |
| TW | 00374967 | 11/1999 |
| WO | WO 94/15287 | 7/1994 |
| WO | WO 97/38372 | 10/1997 |
| WO | WO 00/33195 | 6/2000 |
| WO | WO 01/01614 | 1/2001 |
| WO | 01/16782 A2 | 3/2001 |
| WO | WO 01/15718 | 3/2001 |
| WO | WO 01/16697 | 3/2001 |
| WO | WO 01/16698 | 3/2001 |
| WO | WO 01/16702 | 3/2001 |
| WO | WO 01/16703 | 3/2001 |
| WO | WO 01/16713 | 3/2001 |
| WO | WO 01/16714 | 3/2001 |
| WO | WO 01/16715 | 3/2001 |
| WO | WO 01/16716 | 3/2001 |
| WO | WO 01/16718 | 3/2001 |
| WO | WO 01/16722 | 3/2001 |
| WO | WO 01/16758 | 3/2001 |
| WO | WO 01/16769 | 3/2001 |
| WO | WO 01/16770 | 3/2001 |
| WO | WO 01/16782 | 3/2001 |
| WO | WO 01/18646 | 3/2001 |
| WO | WO 01/41530 | 6/2001 |
| WO | WO 01/48596 | 7/2001 |
| WO | WO 01/48599 | 7/2001 |
| WO | WO 01/48606 | 7/2001 |
| WO | WO 01/48619 | 7/2001 |
| WO | WO 01/50247 | 7/2001 |
| WO | WO 01/50679 | 7/2001 |

OTHER PUBLICATIONS

U.S. Appl. No. 09/473,571, filed Dec. 28, 1999, Wolrich et al.
Byrd et al., "Multithread Processor Architectures," *IEEE Spectrum*, vol. 32, No. 8, New York, Aug. 1, 1995, pp. 38-46.
Doyle et al., *Microsoft Press Computer Dictionary*, 2$^{nd}$ ed., Microsoft Press, Redmond, Washington, USA, 1994, p. 326.
Fillo et al., "The M-Machine Multicomputer," IEEE Proceedings of Micro-28, 1995, pp. 146-156.
Gomez et al., "Efficient Multithreaded User-Space Transport for Network Computing: Design and Test of the TRAP Protocol," *Journal of Parallel and Distributed Computing*, Academic Press, Duluth, Minnesota, USA, vol. 40, No. 1, Jan. 10, 1997, pp. 103-117.
"Hart, Field Communications Protocol, Application Guide", Online! 1999, Hart Communication Foundation, Austin, TX, XP002219606, http://lhd-div.web.cern.ch/lhc-div/IAS/WS/WorldFip/Labo/ap-pguide.pdf.
Haug et al., "Reconfigurable hardware as shared resource for parallel threads," IEEE Symposium on FPGAs for Custom Computing Machines, 1998.
Hauser et al., "Garp: a MIPS processor with a reconfigurable coprocessor," Proceedings of the 5$^{th}$ Annual IEEE Symposium on Field-Programmable Custom Computing Machines, 1997.
Hyde, R., "Overview of Memory Management," *Byte*, vol. 13, No. 4, 1998, pp. 219-225.
Litch et al., "StrongARMing Portable Communications," IEEE Micro, 1998, pp. 48-55.
Romilly Bowden, "What is Hart?," Romilly's Hart and Fieldbus Web Site, Online!, 1977, XP002219605, http://www.romilly.co.uk/whathart.htm.
Schmidt et al., "The Performance of Alternative Threading Architectures for Parallel Communication Subsystems," Internet Document, *Online!*, Nov. 13, 1998.
Thistle et al., "A Processor Architecture for Horizon," IEEE, 1998, pp. 35-41.
Tremblay et al., "A Three Dimensional Register File for Superscalar Processors," IEEE Proceedings of the 28$^{th}$ Annual Hawaii International Conference on System Sciences, 1995, pp. 191-201.
Trimberger et al, "A time-multiplexed FPGA," Proceedings of the 5$^{th}$ Annual IEEE Symposium on Field-Programmable Custom Computing Machines, 1998.
Turner et al., "Design of a High Performance Active Router," Internet Document, *Online*, Mar. 18, 1999.
Vibhatavanijt et al., "Simultaneous Multithreading-Based Routers," Proceedings of the 2000 International Conference of Parallel Processing, Toronto, Ontario, Canada, Aug. 21-24, 2000, pp. 362-359.
Wazlowski et al., "PRSIM-II computer and architecture," IEEE Proceedings, Workshop on FPGAs for Custom Computing Machines, 1993.
"Intel IXP1200 Network Processor Family", Hardware Reference Manual (Dec. 2001).
"IXP1200 Network Processor", Data Sheet (Mar. 2000).
*C-5 Network Processor Architecture Guide*, C-Port Corporation, Freescale Semiconductor, Inc., Part No. C5NPD0-AG/D, May 31, 2001, 642 pages.
Chang, Shu-Ping et al., "An Overview of the Pipelined Common Buffer Architecture (PCBA) for Memory Based Packet/Cell Switching Systems", *IEEE*, pp. 288-297 (1994).
Frazier, Gregory L. et al., "The Design and Implementation of a Multi-Queue Buffer for VLSI Communication Switches", *IEEE*, pp. 466-471 (1989).
Lin, Yu-Sheng et al., "Queue Management for Shared Buffer and Shared Multi-buffer ATM Switches", *IEEE*, pp. 688-695 (1996).
Agarwal et al., "April: A Processor Architecture for Multiprocessing," Proceedings of the 17$^{th}$ Annual International Symposium on Computer Architecture, IEEE, pp. 104-114.
Chang et al., "Branch Classification: A New Mechanism for Improving Branch Predictor Performance," IEEE, pp. 22-31 (1994).
Farkas et al., "The multicluster architecture: reducing cycle time through partitioning," IEEE, vol. 30, Dec. 1997, pp. 149-159.
Hennessy et al., "Computer Organization and Design: The Hardware/Software Interface," Morgan Kaufman Publishers, 1998, pp. 116-119, 181-182, 225-227, 466-470, 476-482, 510-519, 712.
Keckler et al., "Exploiting fine grain thread level parallelism on the MIT multi-ALU processor," IEEE, Jun. 1998.
Mendelson A. et al., "Design Alternatives of Multithreaded Architecture", *International Journal of Parallel Programming*, Plenum Press, New York, 27(3):161-193, Jun. 1999.
Wadler, "The Concatenate Vanishes," University of Glasgow, Dec. 1987 (revised Nov. 1989), pp. 1-7.

Waldspurger et al., "Register Relocation: Flexible Contents for Multithreading," Proceedings of the 20th Annual International Symposium on Computer Architecture, 1993, pp. 120-130.

Intel, "1A-64 Application Developer's Architecture Guide," Rev.1.0, May 1999, pp. 2-2, 4-29 to 4-31, 7-116 to 7-118 and c-21.

Paver et al., "Register Locking in Asynchronous Processor Computer Design: VLSI Processors," ICCD '92 Proceedings, IEEE 1992 International Conference, 1992, pp. 351-355.

Lo, J.L., et al., "Software-Directed Register Deallocation for Simultaneous Multithreaded Processors", *IEEE Transactions on Parallel and Distributed Systems*, 10(9):922-933, Sep. 1999.

Chinese Office Action dated Mar. 6, 2009 for corresponding Chinese patent application No. 03802115.3.

* cited by examiner

DATA TRANSFER MECHANISM USING UNIDIRECTIONAL PULL BUS AND PUSH BUS

BACKGROUND

Typical computer processing systems have buses that enable various components to communicate with each other. Bus communication between these components allow transfer of data commonly through a data path. Generally, the datapath interconnects a processing agent, e.g., a central processing unit (CPU) or processor, with other components such as hard disk drives, device adapters, and the like.

DESCRIPTION

Figure 1:
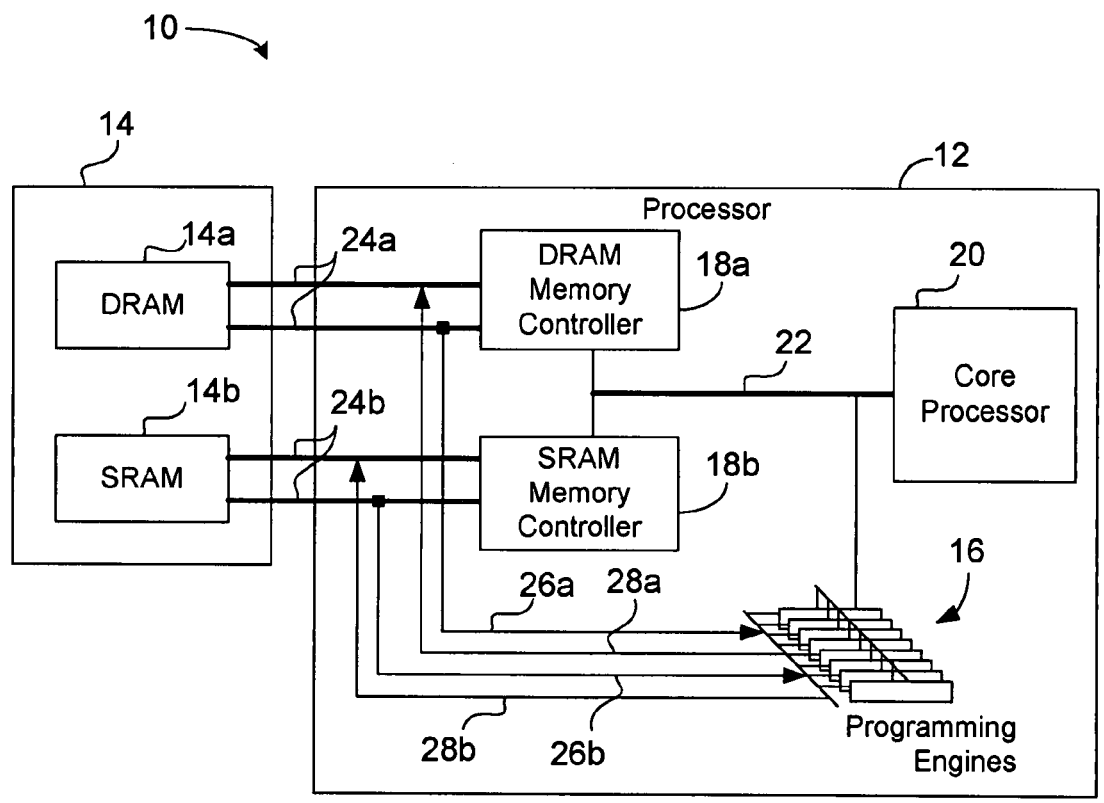
FIG. 1 is a block diagram of a processing system.

Architecture:

Referring to FIG. 1, a computer processing system 10 includes a parallel, hardware-based multithreaded network processor 12. The hardware-based multithreaded processor 12 is coupled to a memory system or memory resource 14. Memory system 14 includes dynamic random access memory (DRAM) 14*a* and static random access memory 14*b* (SRAM). The processing system 10 is especially useful for tasks that can be broken into parallel subtasks or functions. Specifically, the hardware-based multithreaded processor 12 is useful for tasks that are bandwidth oriented rather than latency oriented. The hardware-based multithreaded processor 12 has multiple microengines or programming engines 16 each with multiple hardware controlled threads that are simultaneously active and independently work on a specific task.

The programming engines 16 each maintain program counters in hardware and states associated with the program counters. Effectively, corresponding sets of context or threads can be simultaneously active on each of the programming engines 16 while only one is actually operating at any one time.

In this example, eight programming engines 16 are illustrated in FIG. 1. Each programming engine 16 has capabilities for processing eight hardware threads or contexts. The eight programming engines 16 operate with shared resources including memory resource 14 and bus interfaces. The hardware-based multithreaded processor 12 includes a dynamic random access memory (DRAM) controller 18*a* and a static random access memory (SRAM) controller 18*b*. The DRAM memory 14*a* and DRAM controller 18*a* are typically used for processing large volumes of data, e.g., processing of network payloads from network packets. The SRAM memory 14*b* and SRAM controller 18*b* are used in a networking implementation for low latency, fast access tasks, e.g., accessing look-up tables, memory for the core processor 20, and the like.

Push buses 26*a*-26*b* and pull buses 28*a*-28*b* are used to transfer data between the programming engines 16 and the DRAM memory 14*a* and the SRAM memory 14*b*. In particular, the push buses 26*a*-26*b* are unidirectional buses that move the data from the memory resources 14 to the programming engines 16 whereas the pull buses 28*a*-28*b* move data from the programming engines 16 to the memory resources 14.

The eight programming engines 16 access either the DRAM memory 14*a* or SRAM memory 14*b* based on characteristics of the data. Thus, low latency, low bandwidth data are stored in and fetched from SRAM memory 14*b*, whereas higher bandwidth data for which latency is not as important, are stored in and fetched from DRAM 14*a*. The programming engines 16 can execute memory reference instructions to either the DRAM controller 18*a* or SRAM controller 18*b*.

The hardware-based multithreaded processor 12 also includes a processor core 20 for loading microcode control for other resources of the hardware-based multithreaded processor 12. In this example, the processor core 20 is an XScale™ based architecture.

The processor core 20 performs general purpose computer type functions such as handling protocols, exceptions, and extra support for packet processing where the programming engines 16 pass the packets off for more detailed processing such as in boundary conditions. The processor core 20 has an operating system (not shown). Through the operating system (OS), the processor core 20 can call functions to operate on programming engines 16. The processor core 20 can use any supported OS, in particular a real time OS. For the core processor 20 implemented as an XScale™ architecture, operating systems such as Microsoft NT real-time, VXWorks and μCOS, or a freeware OS available over the Internet can be used.

Advantages of hardware multithreading can be explained by SRAM or DRAM memory accesses. As an example, an SRAM access requested by a context (e.g., Thread_0), from one of the programming engines 16 will cause the SRAM controller 18*b* to initiate an access to the SRAM memory 14*b*. The SRAM controller 18*b* accesses the SRAM memory 14*b*, fetches the data from the SRAM memory 14*b*, and returns data to a requesting programming engine 16.

During an SRAM access, if one of the programming engines 16 had only a single thread that could operate, that programming engine would be dormant until data was returned from the SRAM memory 14*b*.

By employing hardware context swapping within each of the programming engines 16, the hardware context swapping enables other contexts with unique program counters to execute in that same programming engine. Thus, another thread e.g., Thread_1 can function while the first thread, Thread_0, is awaiting the read data to return. During execution, Thread_1 may access the DRAM memory 14*a*. While Thread_1 operates on the DRAM unit, and Thread_0 is operating on the SRAM unit, a new thread, e.g., Thread_2 can now operate in the programming engine 16. Thread_2 can operate for a certain amount of time until it needs to access memory or perform some other long latency operation, such as making an access to a bus interface. Therefore, simultaneously, the processor 12 can have a bus operation, SRAM operation and DRAM operation all being completed or operated upon by one of the programming engines 16 and have one more thread available to process more work.

The hardware context swapping also synchronizes completion of tasks. For example, two threads could hit the shared memory resource, e.g., the SRAM memory 14*b*. Each one of the separate functional units, e.g., the SRAM controller 18*b*, and the DRAM controller 18*a*, when they complete a requested task from one of the programming engine thread or contexts reports back a flag signaling completion of an operation. When the programming engine 16 receives the flag, the programming engine 16 can if determine which thread to turn on.

One example of an application for the hardware-based multithreaded processor 12 is as a network processor. As a network processor, the hardware-based multithreaded processor 12 interfaces to network devices such as a Media Access Controller (MAC) device, e.g., a 10/100BaseT Octal MAC 13a or a Gigabit Ethernet device (not shown). In general, as a network processor, the hardware-based multi-threaded processor 12 can interface to any type of communication device or interface that receives or sends large amount of data. The computer processing system 10 functioning in a networking application could receive network packets and process those packets in a parallel manner.

Programming Engine Contexts:

As described above, each of the programming engines 16 supports multi-threaded execution of eight contexts. This allows one thread to start executing just after another thread issues a memory reference and must wait until that reference completes before doing more work. Multi-threaded execution is critical to maintaining efficient hardware execution of the programming engines 16 because memory latency is significant. Multi-threaded execution allows the programming engines 16 to hide memory latency by performing useful independent work across several threads.

Each of the eight contexts of the programming engines 16, to allow for efficient context swapping, has its own register set, program counter, and context specific local registers. Having a copy per context eliminates the need to move context specific information to and from shared memory and programming engine registers for each context swap. Fast context swapping allows a context to perform computations while other contexts wait for input-output (I/O), typically, external memory accesses to complete or for a signal from another context or hardware unit.

For example, the programming engines 16 execute eight contexts by maintaining eight program counters and eight context relative sets of registers. A number of different types of context relative registers, such as general purpose registers (GPRs), inter-programming agent registers, Static Random Access Memory (SRAM) input transfer registers, Dynamic Random Access Memory (DRAM) input transfer registers, SRAM output transfer registers, DRAM output transfer registers. Local memory registers can also be used.

For example, GPRs are used for general programming purposes. GPRs are read and written exclusively under program control. The GPRs, when used as a source in an instruction, supply operands to an execution datapath (not shown). When used as a destination in an instruction, the GPRs are written with the result of the execution box datapath. The programming engines 16 also include IO transfer registers as discussed above. The IO transfer registers are used for transferring data to and from the programming engines 16 and locations external to the programming engines 16, e.g., the DRAM memory 14a and the SRAM memory 14b etc.

Figure 2:
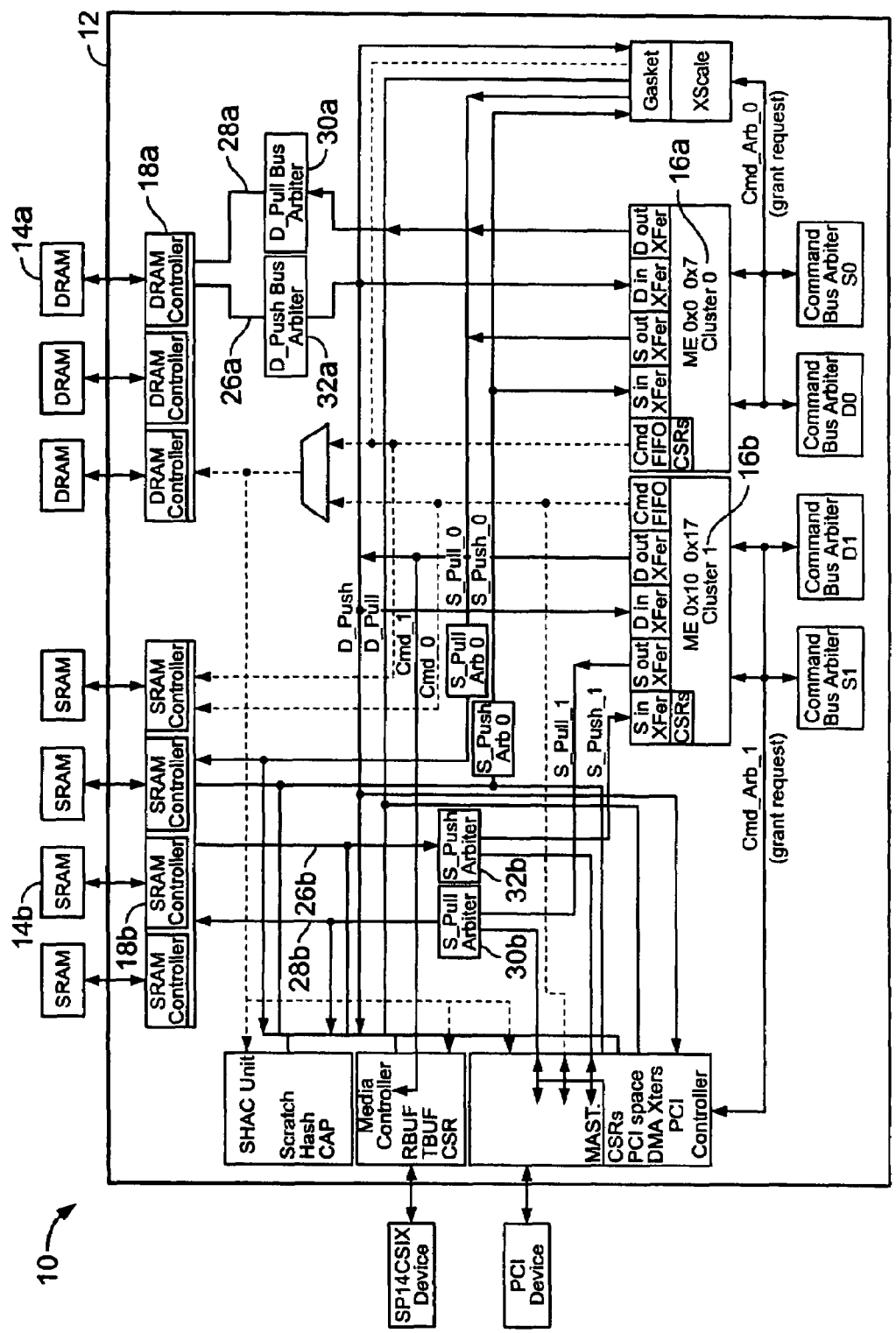
FIG. 2 is a detailed block diagram of the processing system of FIG. 1.

Bus Architecture:

Referring to FIG. 2, the hardware-based multithreaded processor 12 is shown in greater detail. The DRAM memory 14a and the SRAM memory 14b are connected to the DRAM memory controller 18a and the SRAM memory 18b, respectively. The DRAM controller 18a is coupled to a pull bus arbiter 30a and a push bus arbiter 32a, which are coupled to a programming engines 16a. The SRAM controller 18b is coupled to a pull bus arbiter 30b and a push bus arbiter 32b, which are coupled to a programming engine 16b. Buses 26a-26b and 28a-28b make up the major buses for transferring data between the programming engines 16a-16b and the DRAM memory 14a and the SRAM memory 14b. Any thread from any of the programming engines 16a-16b can access the DRAM controller 18a and the SRAM controller 18a.

In particular, the push buses 26a-26b have multiple sources of memory such as memory controller channels and internal read registers (not shown) which arbitrate via the push arbiters 32a-32b to use the push buses 26a-26b. The destination (e.g., programming engine 16) of any push data transfer recognizes when the data is being "pushed" into it by decoding the Push_ID, which is driven or sent with the push data. The pull buses 28a-28b also have multiple destinations (e.g., writing data to different memory controller channels or writeable internal registers) that arbitrate to use the pull buses 28a-28b. The pull buses 28a-28b have a Pull_ID, which is driven or sent, for example, two cycles before the pull data.

Data functions are distributed amongst the programming engines 16. Connectivity to the DRAM memory 14a and the SRAM memory 14b is performed via command requests. A command request can be a memory request. For example, a command request can move data from a register located in the programming engine 16a to a shared resource, e.g., the DRAM memory 14a, SRAM memory 14b. The commands or requests are sent out to each of the functional units and the shared resources. Commands such as I/O commands (e.g., SRAM read, SRAM write, DRAM read, DRAM write, load data from a receive memory buffer, move data to a transmit memory buffer) specify either context relative source or destination registers in the programming engines 16.

In general, the data transfers between programming engines and memory resources designate the memory resource for pushing the data to a processing agent via the push bus having a plurality of sources that arbitrate use of the push bus, and designate the memory resource for receiving the data from the processing agent via the pull bus having a plurality of destinations that arbitrate use of the pull bus.

Figure 3:
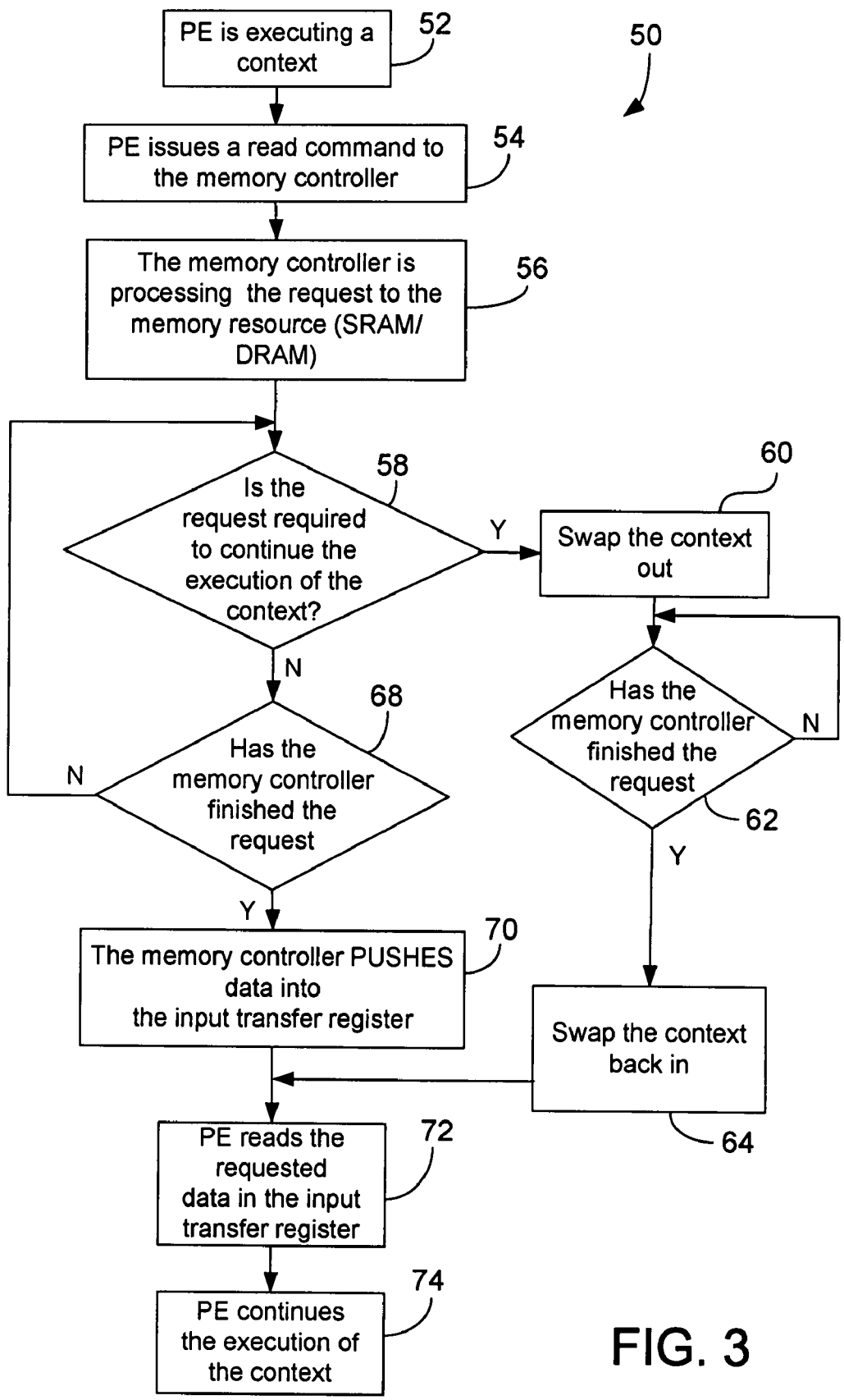
FIG. 3 is a flow chart of a read process in the processing system of FIG. 1.

Read Process:

Referring to FIG. 3, a data read process 50 is executed during a read phase of the programming engines 16 by the push buses 26a-26b. As part of the read process 50 the programming engine executes (52) a context. The programming engine 16 issues (54) a read command to the memory controllers 18a-18b, and the memory controllers 18a-18b processes (56) the request for one of the memory resources, i.e., the DRAM memory 14a or the SRAM memory 14b. For read commands, after the read command is issued (54), the programming engines 16 check (58) if the read data is required to continue the program context. If the read data is required to continue the program context or thread, the context is swapped out (60). The programming engine 16 checks (62) to ensure that the memory controllers 18a-18b have finished the request. When the memory controllers have finished the request, the context is swapped back in (64).

If the request is not required to continue the execution of the context, the programming engine 16 checks (68) if the memory controllers 18a-18b have finished the request. If the memory controllers 18a-18b have not finished the request, a loop back occurs and further checks (58) take place. If the memory controllers 18a-18b have finished the request, when the read data has been acquired from the memory resources, the memory controllers 18a-18b push (70) the data into the context relative input transfer register specified by the read command. The memory controller sets a signal in the programming engine 16 that enables the context that issued the read to become active. The programming engine 16 reads (72) the requested data in the input transfer register and continues (74) the execution of the context.

Figure 4:
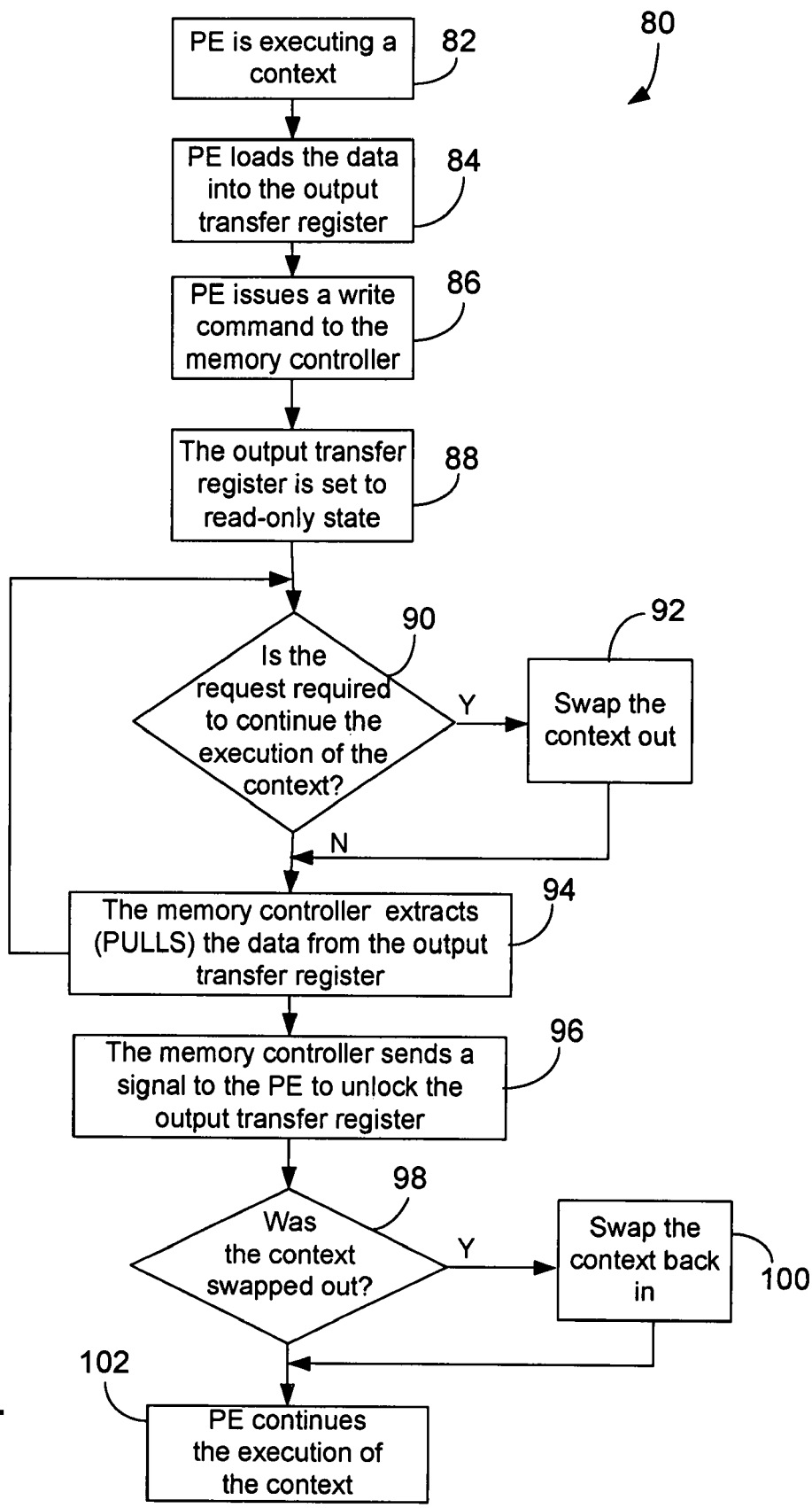
FIG. 4 is a flow chart of a write process in the processing system of FIG. 1.

Write Process:

Referring to FIG. 4, a data write process 80 is executed during a write phase of the programming engines 16 by the pull buses 28*a*-28*b*. During the write process 80 the programming engine executes (82) a context. The programming engine 16 loads (84) the data into the output transfer register and issues (86) a write command or request to the memory controllers 18*a*-18*b*. The output transfer register is set (88) to a read-only state. For write commands from the programming engines 16, after the output transfer register is set (88) to a read-only state, the programming engine 16 checks (90) if the request is required to continue the program context or thread. If yes, the context is swapped out (92).

If the write request is not required to continue the program context or thread, the memory controllers 18*a*-18*b* extracts or pulls (94) the data from the output transfer registers and signals (96) to the programming engines 16 to unlock the output transfer registers. The programming engine 16 then checks (98) if the context was swapped out. If so, the context is swapped back (100) and if not, the programming engine 16 continues (102) the execution of the context. Thus, the signaled context can reuse the output transfer registers. The signal may also be used to enable the context to go active if it swapped out (100) on the write command.

Figure 5:
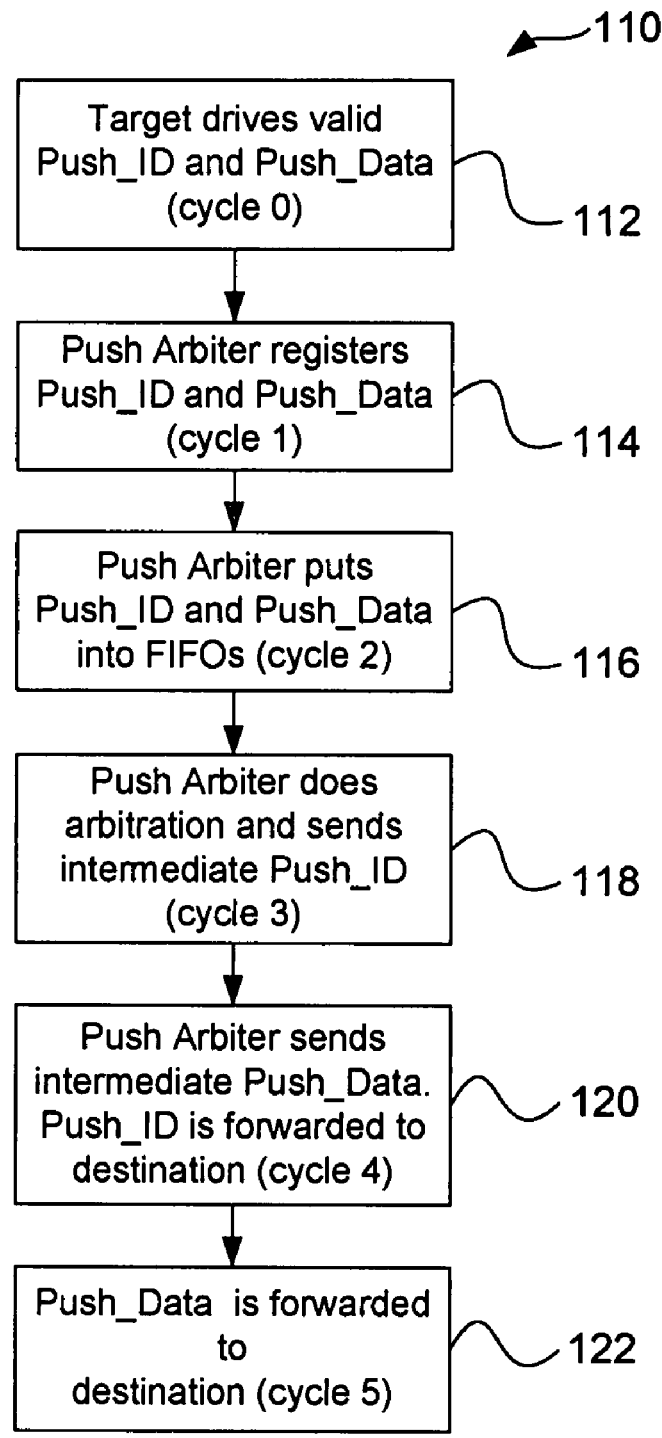
FIG. 5 is a flow chart of a push operation of the processing system of FIG. 1.

Data Push Operation:

Referring to FIG. 5, a data push operation 110 that occurs in the push buses 26*a*-26*b* of the computer processing system 10, is shown in different processing cycles, e.g., cycle 0 through cycle 5. Each target, e.g., the DRAM memory 14*a* or the SRAM memory 14*b*, sends or drives (112) a Target_#_Push_ID to the push arbiters where the # indicates the number of different contexts such as context #0 through context #7. The Target_#_Push_ID is derived from the read command and a data error bit (e.g., the numbers following the target represent the source address incrementing in the Push_ID) for information it would like to push to the push arbiters 32*a*-32*b*. For Push_IDs, each letter indicates a push operation to a particular destination. A Push_ID destination of "none" indicates that the Push_ID is null. The target also sends the Target_#_Push_Data to the Push Arbiter.

The Push_ID and Push_Data are registered (114) and enqueued (116) into first-in, first-outs (FIFOs) in the push arbiters 32*a*-32*b* unless the Target_#_Push_Q_Full signal is asserted. This signal indicates that the Push_ID and Push_Data FIFOs for that specific target are almost full in the push arbiters 32*a*-32*b*. In this case, the push arbiters 32*a*-32*b* have not registered a Push_ID or Push_Data and the target does not change it. The channel changes the Push_ID and Push_Data that is taken by the push arbiters 32*a*-32*b* to those for the next word transfer or to null if it has no other valid transfer. Due to latency in the Push_Q_Full signal, the push arbiters 32*a*-32*b* should accommodate the worst case number of in-flight Push_IDs and Push_Data per target.

The push arbiters 32*a*-32*b* will arbitrate (118) every cycle between all valid Push_IDs and send intermediate Push_ID. The arbitration policy can be round robin, a priority scheme or even programmable. Multiple pushes of data from the push arbiters 32*a*-32*b* to the destination are not guaranteed to be on consecutive cycles. The push arbiters 32*a*-32*b* send (12) intermediate Push_Data and Push_ID is forwarded (120) to the destination. It is up to the target to update the destination address of each Push_ID it issues for each word of data it wishes to push. The Push_Data is forwarded (122) to the destination. At the destination, the time from the destination getting the Push_ID to the destination getting Push_Data is fixed by one processing cycle.

Figure 6:
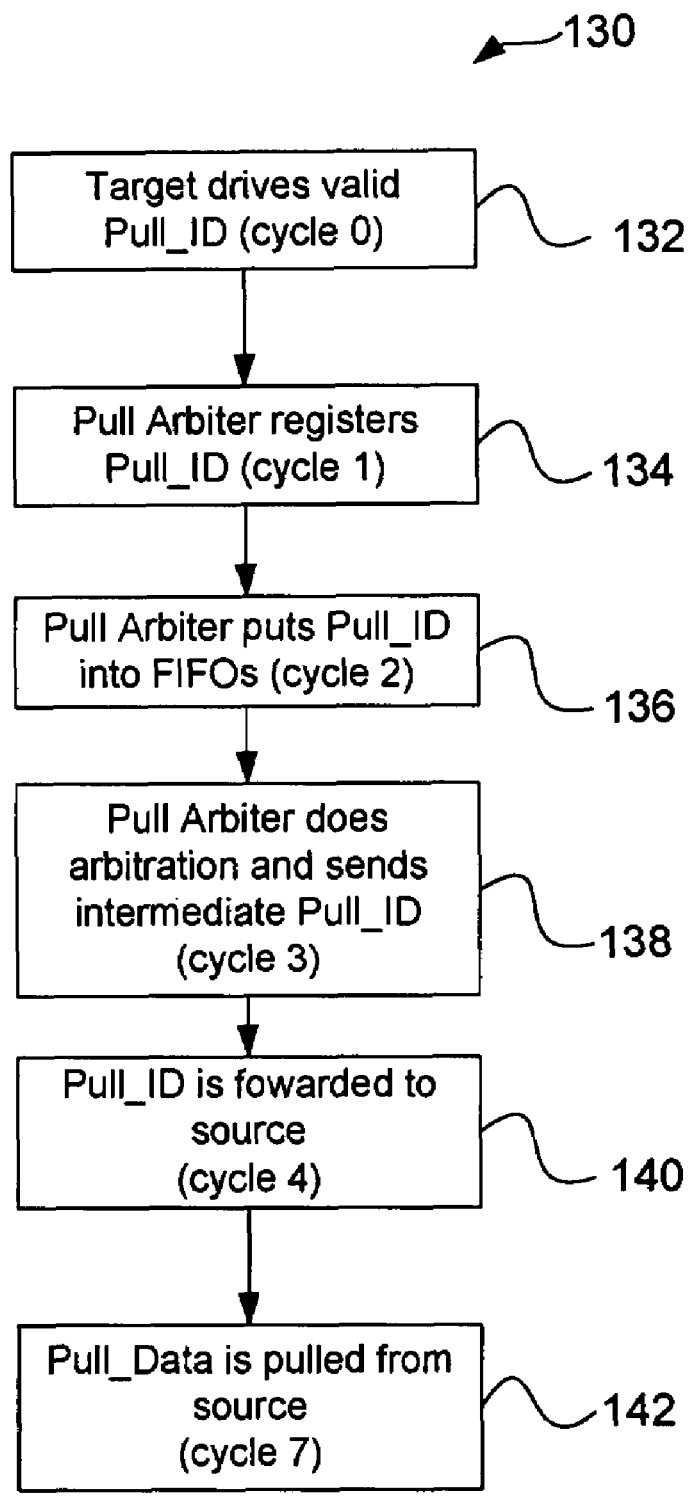
FIG. 6 is a flow chart of a pull operation of the processing system of FIG. 1.

Data Pull Operation:

Referring to FIG. 6, a data pull operation 130 that occurs in the pull buses 28*a*-28*b* of the computer processing system 10, is shown in different processing cycles (e.g., cycle 0 through cycle 7). Each target, e.g., the DRAM memory 14*a* or the SRAM memory 14*b*, sends or drives (132) the full Target_#_Pull_ID (i.e., the numbers following the target represents the source address incrementing in the Pull_ID) and length (derived from the write command) for information it would like to pull to the target. For Pull_IDs, each letter indicates a pull operation from a particular source, e.g., the memory resource 14. A Pull_ID source of "none" indicates that the Pull_ID is null. The target must have buffer space available for the pull data when it asserts its Pull_ID.

The Pull_ID is registered (134) and enqueued (136) into fist-in, first-outs (FIFO) in the pull arbiters 30*a*-30*b*, unless the Target_#_Pull_Q_Full signal is asserted. This signal indicates that the Pull_ID queue for that specific target is almost full in the pull arbiters 30*a*-30*b*. In this case, the pull arbiters 30*a*-30*b* have not registered the Pull_ID and the target does not change it. The target changes a Pull_ID that is taken by the pull arbiters 30*a*-30*b* to that for the next burst transfer or to null if it has no other valid Pull_ID. Due to latency in the Pull_Q_Full signal, the pull arbiters 30*a*-30*b* should accommodate the worst case number of in-flight Pull_IDs per target.

The pull arbiters 30*a*-30*b* arbitrate (138) every cycle among the currently valid Pull_IDs. The arbitration policy can be round robin, a priority scheme or even programmable.

The pull arbiters 30*a*-30*b* forwards (140) the selected Pull_ID to the source. The time from the pull arbiters 30*a*-30*b* sending the Pull_ID to the source providing data is fixed in three processing cycles. The pull arbiters 30*a*-30*b* update the "source address" field of the Pull_ID for each new data item. The Pull_Data is pulled (142) from the source and sent to the targets.

The pull arbiters 30*a*-30*b* also assert (146) a Target_#_Take_Data to the selected target. This signal is asserted for each cycle a valid word of data is sent to the target. However, the assertions are not guaranteed to be on consecutive processing cycles. The pull arbiters 30*a*-30*b* only assert at most one Target_#_Take_Data signal at a time.

For example, a computer program product residing on a computer readable medium for causing a parallel processor to perform a function includes instructions causing the processor to designate the memory resource for pushing the data to the processing agent using a push bus having a plurality of sources that arbitrate use of the push bus; and designate the memory resource for receiving the data from the processing agent using a pull bus having a plurality of destinations that arbitrate use of the pull bus. The computer program product can include instructions causing the processor to establish a plurality of contexts on the programming agent and maintaining program counters and context relative registers. The programming agent in a read phase can execute a context and issue a read command to a memory controller. The memory controller can process the read command to be sent to the memory resource and the context can be swapped out if the read command is required to continue the execution of the context.

For transfers between targets and masters with different bus widths, the pull arbiters 30*a*-30*b* are required to do the adjusting. For example, the DRAM controller 18*b* may accept eight bytes of data per processing cycle but the programming engine 16 may only deliver four bytes per cycle. In this case, the pull arbiters 30*a*-30*b* can be used to accept four bytes per processing cycle, merge and pack them into eight bytes, and send the data to the DRAM controller 18*a*.

Other Embodiments

It is to be understood that while the example above has been described in conjunction with the detailed description thereof, the foregoing description is intended to illustrate and not limit the scope of the invention, which is defined by the scope of the At appended claims. Other aspects, advantages, and modifications are within the scope of the following claims.

What is claimed is

1. A method comprising:
identifying a plurality of memory resources for pushing data to and pulling data from a processing agent;
when pushing data to the processing agent,
using a push bus arbiter to arbitrate requests for use of a push bus by the memory resources in which the requests for using the push bus are sent from the memory resources, and
pushing data from the memory resources to the processing agent through the push bus, the memory resources obtaining access to the push bus based on arbitration by the push bus arbiter;
when pulling data from the processing agent,
using a pull bus arbiter to arbitrate requests for use of a pull bus by the memory resources in which the requests for using the pull bus are sent from the memory resources,
executing a context,
issuing a write command,
loading data into an output transfer memory of the processing agent,
setting the output transfer memory to a read-only state, and
pulling the data from the output transfer memory and transferring to the memory resources through the pull bus, the memory resources obtaining access to the pull bus based on arbitration by the pull bus arbiter; and
establishing a plurality of contexts on the processing agent and maintaining program counters and context relative registers;
wherein the processing agent executes a context and issues a read command to a memory controller in a read phase.

2. The method of claim 1 wherein the memory controller processes the read command to be sent to one of the memory resources.

3. The method of claim 2 wherein the context executed by the processing agent is swapped out if the read data is required to continue the execution of the swapped out context.

4. The method of claim 3 wherein after the memory controller has completed the processing of the read command, the memory controller pushes the data from the memory resources to an input transfer memory of the processing agent.

5. The method of claim 4 wherein the input transfer memory comprises an input transfer register.

6. The method of claim 5 wherein after the data from the memory resources has been pushed, the processing agent reads the data in the input transfer register and the processing agent continues the execution of the context.

7. The method of claim 1 wherein the context executed by the processing agent is swapped out if the write command is required to continue the execution of the swapped out context.

8. The method of claim 7, wherein the memory controller pulls the data from the output transfer memory and the memory controller sends a signal to the processing agent to unlock the output transfer memory.

9. The method of claim 8 wherein if the context executed by the processing agent has been swapped out after the output transfer memory has been unlocked, the swapped out context is swapped back in and the processing agent continues the execution of the swapped out context.

10. The method of claim 1, wherein the memory resources comprise memory controller channels.

11. The method of claim 1 wherein the output transfer memory comprises an output transfer register.

12. A system comprising:
a plurality of memory resources, each memory resource being associated with a memory controller;
a processing agent to access the memory resources;
a unidirectional push bus to push data from the memory resources to the processing agent;
a push bus arbiter to arbitrate requests for use of the push bus by the memory resources in which the requests for using the push bus are sent from the memory resources, the memory resources obtaining access to the push bus based on arbitration by the push bus arbiter;
a unidirectional pull bus to receive data from the processing agent and to transfer the received data to the memory resources;
a pull bus arbiter to arbitrate requests for use of the pull bus by the memory resources in which the requests for using the pull bus are sent from the memory resources, the memory resources obtaining access to the pull bus based on arbitration by the pull bus arbiter; and
a plurality of program counters and a plurality of context relative registers, the context relative registers being selected from a group comprising of general purpose registers, inter-programming agent registers, static random access memory (SRAM) input transfer registers, dynamic random access memory (DRAM) input transfer registers, SRAM output transfer registers, DRAM output transfer registers, and local memory registers;
in which the processing agent is to execute a context and issue a read command to the memory controller.

13. The system of claim 12 in which the memory controller is to process the read command to be sent to the memory resources.

14. The system of claim 13 in which the processing agent is to swap the context out if the read command is required to continue the execution of the context.

15. The system of claim 14 in which after the read command is processed, the memory controller is to push the received data to an input transfer register of the processing agent and the processing agent is to read the data in the input transfer register and to continue the execution of the context.

16. The system of claim 12, wherein the memory resources comprise memory controller channels.

17. The system of claim 12 wherein the memory resources comprise random access memory devices.

18. The system of claim 12 wherein each of the requests for use of the push bus or pull bus sent from the memory resources comprises a target identifier identifying a target to receive data pushed from or pulled to the memory resources.

19. A computer readable medium, which when accessed results in a machine performing operations comprising:

identifying a plurality of memory resources for pushing data to and pulling data from a processing agent, each memory resource being associated with a memory controller;

when pushing data to the processing agent,
- using a push bus arbiter to arbitrate requests for use of a push bus by the memory resources in which the requests for using the push bus are sent from the memory resources,
- pushing data from the memory resources to the processing agent through the push bus, the memory resources obtaining access to the push bus based on arbitration by the push bus arbiter; and when pulling data from the processing agent,
- using a pull bus arbiter to arbitrate requests for use of a pull bus by the memory resources in which the requests for using the pull bus are sent from the memory resources, and
- pulling data from the output transfer memory and transferring the pulled data to the memory resources through the pull bus, the memory resources obtaining access to the pull bus based on arbitration by the pull bus arbiter;

wherein the processing agent in a read phase executes a context and issues a read command to a memory controller.

20. The computer readable medium of claim 19, which when accessed further results in the machine performing operations comprising establishing a plurality of contexts on the processing agent and maintaining program counters and context relative registers.

21. The computer readable medium of claim 19, wherein the memory resources comprise memory controller channels.

22. The computer readable medium of claim 19 wherein the output transfer memory comprises an output transfer register.

23. A computer readable medium, which when accessed results in a machine performing operations comprising:

identifying a plurality of memory resources for pushing data to and pulling data from a processing agent, each memory resource being associated with a memory controller;

when pushing data to the processing agent,
- using a push bus arbiter to arbitrate requests for use of a push bus by the memory resources in which the requests for using the push bus are sent from the memory resources,
- pushing the data from the memory resources to the processing agent through the push bus, the memory resources obtaining access to the push bus based on arbitration by the push bus arbiter; and when pulling data from the processing agent,
- using a pull bus arbiter to arbitrate requests for use of a pull bus by the memory resources in which the requests for using the pull bus are sent from the memory resources, and
- pulling data from an output transfer memory and transferring the pulled data to the memory resources through the pull bus, the memory resources obtaining access to the pull bus based on arbitration by the pull bus arbiter;

wherein the memory controller processes a read command to be sent to the memory resources and a context is swapped out if the read command is required to continue the execution of the context.

24. A method comprising:

identifying a plurality of memory resources for pushing data to and pulling data from a processing agent;

using a push bus arbiter to arbitrate use of a unidirectional push bus by the memory resources in which requests for using the unidirectional push bus are sent from the memory resources;

pushing data from the memory resources to the processing agent through the push bus, the memory resources obtaining access to the push bus based on arbitration by the push bus arbiter;

using a pull bus arbiter to arbitrate use of a unidirectional pull bus by the memory resources in which requests for using the unidirectional pull bus are sent from the memory resources; and pulling data from the processing agent and transferring to the memory resources through the pull bus, the memory resources obtaining access to the pull bus based on arbitration by the pull bus arbiter; and executing a context and issuing a read command to a memory controller to read data from one of the memory resources.

25. The method of claim 24, further comprising swapping out the context if the data to be read is required to continue the execution of the context.

26. The method of claim 24, further comprising executing a second context and issuing a write command to the memory controller to write data to one of the memory resources.

27. The method of claim 26, further comprising swapping out the second context if completion of the write command is required to continue the execution of the second context.

28. The method of claim 24 wherein the memory resources comprise random access memory devices.

29. The method of claim 24 wherein each of the requests for use of the push bus or pull bus sent from the memory resources comprises a target identifier identifying a target to receive data pushed from or pulled to the memory resources.

* * * * *